June 17, 1952   M. P. WINTHER ET AL   2,601,076
MAGNETIC FLUID MIXTURE CLUTCH

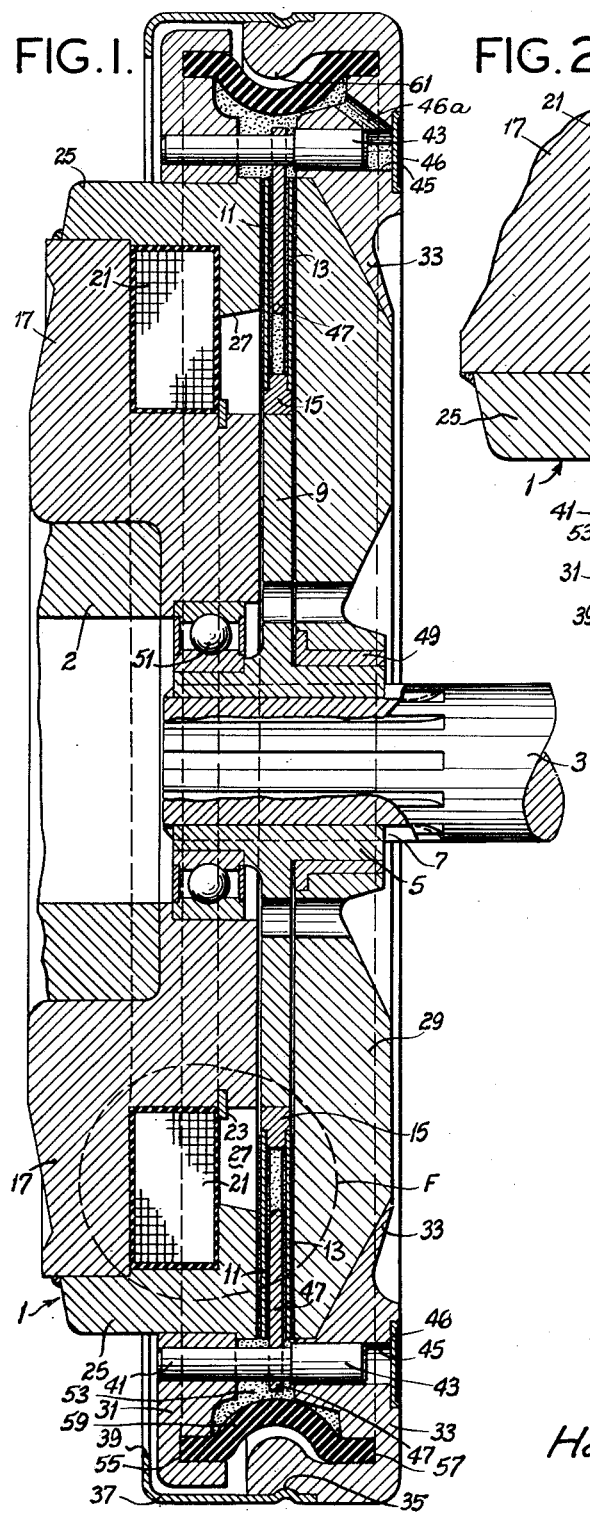
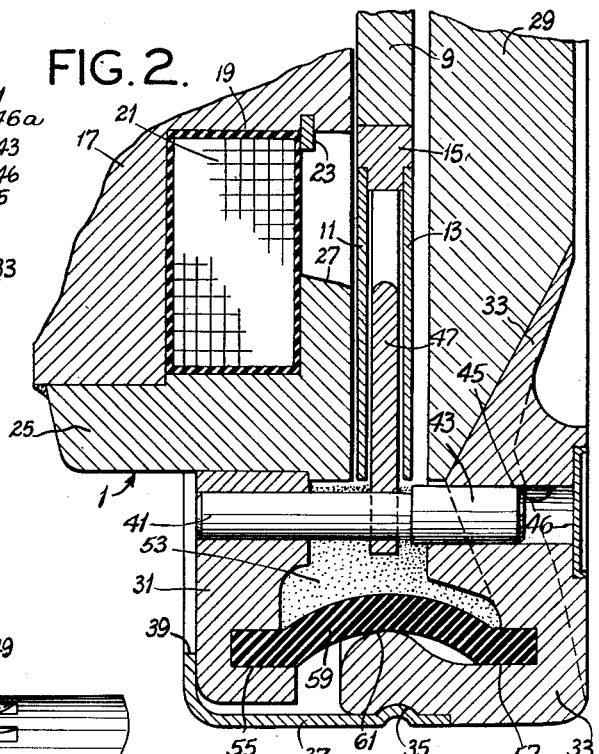

Filed March 28, 1949   3 Sheets-Sheet 2

June 17, 1952 M. P. WINTHER ET AL 2,601,076
MAGNETIC FLUID MIXTURE CLUTCH
Filed March 28, 1949 3 Sheets-Sheet 3
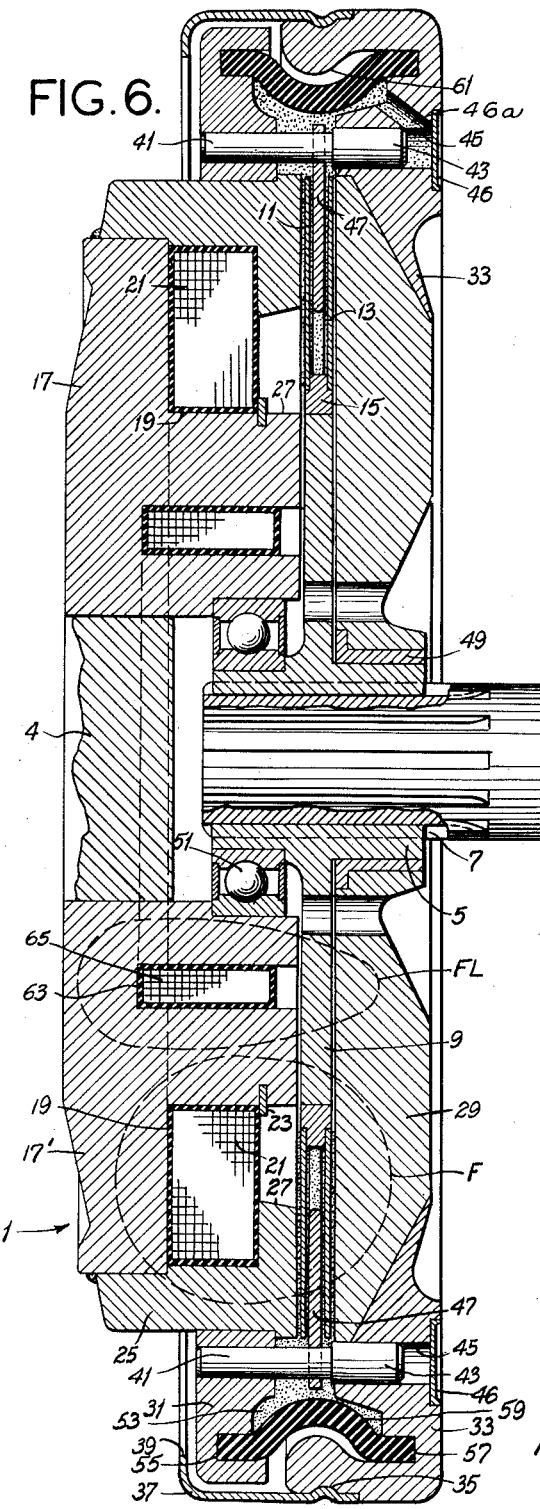
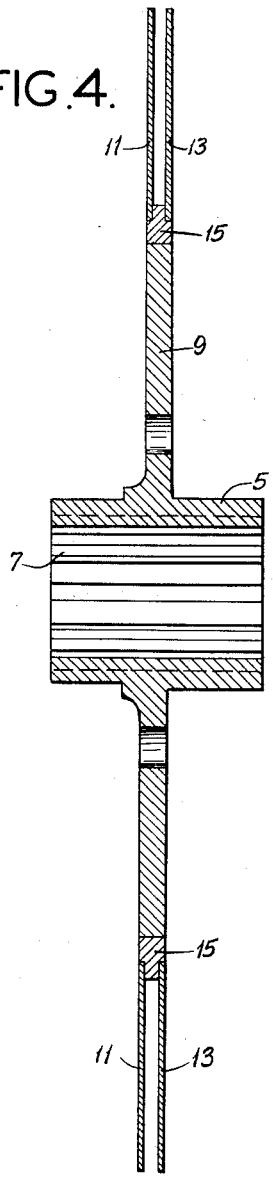
Martin P. Winther,
Anthony Winther,
Inventors.
Haynes and Koenig,
Attorneys.

Patented June 17, 1952

2,601,076

UNITED STATES PATENT OFFICE 2,601,076

MAGNETIC FLUID MIXTURE CLUTCH

Martin P. Winther, Gates Mills, Ohio, and Anthony Winther, Kenosha, Wis., assignors to Martin P. Winther, as trustee Application March 28, 1949, Serial No. 83,980

19 Claims. (Cl. 192—21.5)

This invention relates to electromagnetic clutches, and more particularly to such clutches employing a magnetic fluid or the like.

By means of the present invention, simple clutches may be built so as to be closed smoothly by means of directly applied magnetic force, and to effect a final non-slipping drive having substantially more torque than heretofore for a given clutch weight. Briefly, this is accomplished by magnetically drawing together two or more spaced magnetic pressure applying members or plates so as to squeeze into the gaps which exist between the plates before closure, a magnetic fluid mixture or the like. Thus the gaps, instead of freely and completely closing as in prior friction clutches, become and remain filled with the magnetic fluid mixture, the consistency of which stiffens under the applied magnetic field and forms a lamination of driving material between the driving and driven faces of the discs, without the latter coming into actual contact. The result is a smooth pick-up action during closure before the fluid material has completely magnetically stiffened against shearing, followed by a strong resistance against shearing after complete closure with a resulting high driving torque under non-slip conditions. In addition, continued magnetic action on the pressure plates after closure maintains mechanical pressure on the magnetically stiffened fluid. This reduces the tendency to slippage between the plate surfaces and the fluid, and further increases the torque capacity. The result is a smoothly modulating clutch of very high capacity and long life, the latter being due to the absence of any frictional wear on the faces of the driving or driven discs or plates.

Moreover, the clutch is adapted to release completely when deenergized, with a substantially complete absence of drag.

In its broadest aspect, the invention comprises squeezing between the moving surfaces of an energized clutch a shearing magnetic fluid mixture or the like which, as it takes its position between the surfaces, becomes stiffened by magnetization to the point at which it cannot be further sheared under the driving torque for which the clutch is designed; together with simple means for substantially completely eliminating the magnetic fluid mixture from between the surfaces when the clutch is released so as to eliminate drag when the clutch is open.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a longitudinal section taken through one form of the invention, showing the clutch in closed driving condition;

Fig. 2 is an enlarged fragmentary view showing the clutch parts in open condition;

Fig. 4 is an individual detail section of one clutch element or plate;

Fig. 6 is a view similar to Fig. 1, showing an alternative form of the invention in closed condition.

Similar reference characters indicate corresponding parts throughout the several views of the drawings.

Figure 3:
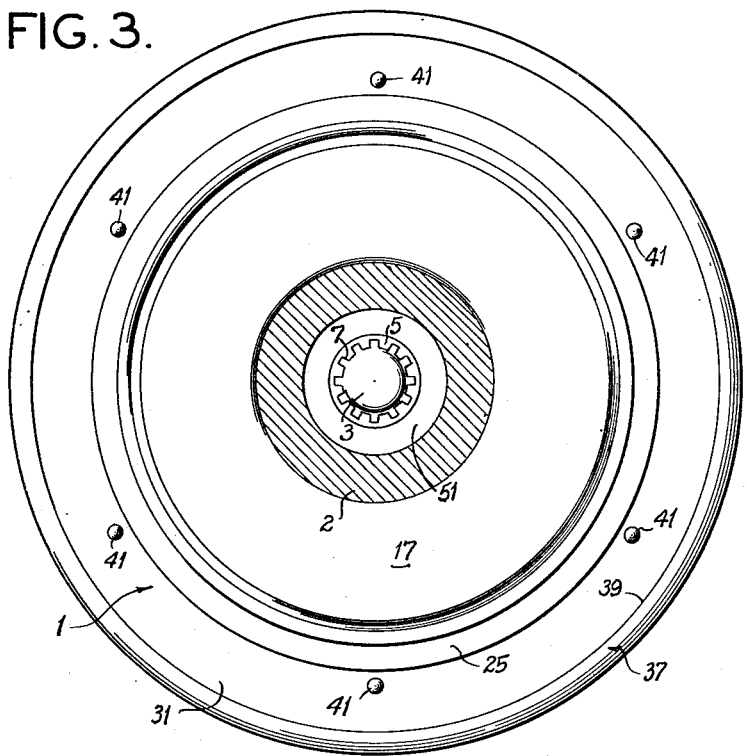
Fig. 3 is a reduced left-end view of Fig. 1.
Figure 5:
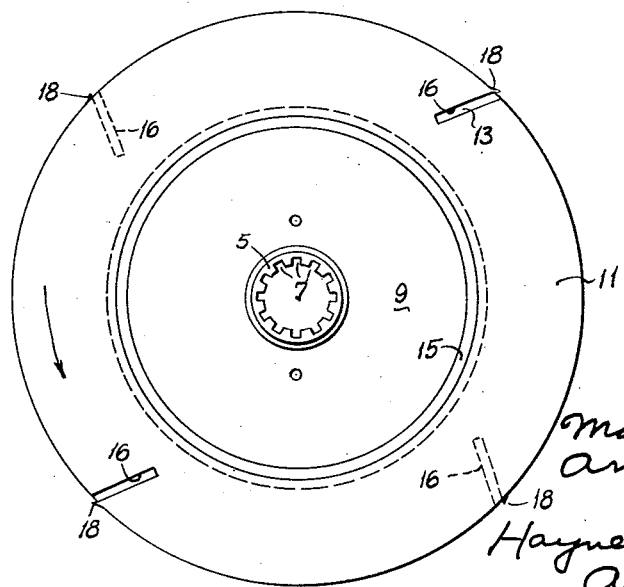
Fig. 5 is a reduced left side view of Fig. 4.

Referring now more particularly to Fig. 1, there is shown at numeral 1 what will hereinafter be referred to as the driving element, and at numeral 3 the driven element of the clutch, but the driving and driven functions may be reversed with respect to these parts. For the purpose of description, but without limitation, the driving element 1 may be considered to be built as part of a flywheel of, say, an internal combustion engine. A part of the flywheel is shown at 2. The driven element comprises a hub 5 having internal splines 7 for rotary driving engagement with complementary splines on a driven shaft 3. Thus the driven element may drive the driven shaft. A driven element without the shaft 3 is shown isolated and in detail in Figs. 4 and 5 and comprises a magnetic (ferrous) disc 9, forming a flange on the hub 5. Spaced magnetic (ferrous) rings or plates 11 and 13 are attached to the disc 9 by means of a nonmagnetic ring 15. This ring may, for example, be composed of stainless steel. The rings 11 and 13 are angle slotted as shown at 16 and barbed on one side of each slot as shown at 18 for purposes which will appear. There are two diagonally opposite slots and barbs in each ring, the pairs in the adjacent rings being staggered at 90°.

The driving member 1 comprises a magnetic (ferrous) member 17 having an internal right-angular seat 19 for an annular field coil 21. This coil may be supplied with direct current from a suitable D. C. circuit through slip rings or the like, which are not shown since the details of methods of supplying current to rotating coils are well known. The coil 21 is held in position by a lock ring 23 and an outside magnetic ring 25 which is welded to the member 17. These parts are located on one side of the driven member 3. Their faces adjacent member 3 are coplanar. An annular space 27 is left between the members 17 and 25 on one side of the coil 21. The members 17 and 25 form what may be referred to as one magnetic clamp member or plate on one side of the members 9 and 11.

On the other side of the driven member is a second magnetic clamp member or plate 29 which has a flat face adjacent to the members 9 and 13. Fastened to the outside of the rings 25 and 29, respectively, are nonmagnetic (aluminum) rings 31 and 33, respectively. Spun into a groove 35 of the ring 33 is a band 37 which, beyond the ring 31, has an inturned flange 39 as indicated in Fig. 2, which limits any separating axial motion that the ring 29 has with respect to the rings 17 and 25. This movement is about $\frac{1}{16}$ inch or so. Anchored in the ring 31 are non-magnetic (stainless steel) studs or pins 41 which reach into the ring 33 where they are provided with heads 43 which may slide in holes 45. Beyond the studs the holes 45 are provided with sealing plugs 46. The studs 41 pass freely through openings in the periphery of an intermediate driving plate 47 which is magnetic (ferrous). This intermediate driving plate is interposed between the rings 11 and 13 of the driven member, but floats upon the studs. A sleeve bearing 49 permits relative axial and rotary motion between the hub 5 and the ring 29 and a pilot ball bearing 51 permits relative rotary motion between the hub 5 and the ring 17.

Space 53 is provided between the rings 31 and 33 for containing all of a quantity of magnetic fluid mixture, the character of which will be described below. In order to contain this fluid mixture, the rings 31 and 33 are respectively grooved, as shown at 55 and 57, for sealing reception of the edges of a continuous peripheral band of resilient or flexible material 59. For instance, this material may be composed of relatively thick rubber (preferably of a synthetic variety) which will withstand attack of oil, grease and the like. Throughout its middle periphery, the band 59 is bowed where it is backed on the outside by means of a smoothly formed internal bead 61 within the ring 33. Thus upon any axial movement between the rings 31 and 33, the band 59 will assume the positions shown in Figs. 1 and 2, or intermediate positions. It is to be understood that other equivalents may be used for the band such as a convoluted metal bellows or the like.

The magnetic fluid mixture, which is indicated by stippling, may be any one of a number of substances, such as, for example, a fairly thin machine oil, such as SAE No. 10 or the equivalent, mixed with nine parts by weight of finely divided magnetic, relatively low reluctance metal particles. The particles should preferably be as round as feasible and of small mean diameter (approximately 8 microns). This amounts to a powder. A suitable finely divided magnetic iron serving the purpose is on the market under the name of Carbonyl-E iron. Another is Swedish powdered iron of about 300 mesh. This mixture of 9:1 of iron particles to oil is a somewhat viscous fluid but does not have the viscous drag of a heavy oil. It will also become magnetized by induction. In cases where the clutch is to be used under varying (including low) temperature conditions, the liquid should have as constant a viscosity as it is possible to obtain. Fairly constant-viscosity oils are on the market. Or silicone liquids may be used (silicone DC 500, for example).

If a grease base is used, a suitable one is silicone grease in a ratio by weight of iron particles to grease of 3:1. It will be seen that the above mixtures are constituted by a magnetic component (the finely divided iron) and a lubricating component (the oil or grease). It is to be understood that if a dry flowable mixture is desired, the finely divided iron may be mixed with a dry lubricant, such as, for example, powdered steatite, graphite, or the like.

Operation is as follows, referring first to Fig. 2, which shows an open condition of the clutch wherein the coil 21 is deenergized:

The expansive action of the band 59 tends axially to separate the plate assembly 17, 25, 31 (on the one hand) from the assembly 29, 33 (on the other hand). It may be assumed that the parts are rotating, carrying with them the studs 41 and also rotating the intermediate ring 47. Since there is clearance between the driven rings 11 and 13 and the other parts, the magnetic flowable material being flung out centrifugally, any drag between the rotating parts and the stationary assembly 1 is negligible. In order for this condition to exist, the amount of flowable magnetic material must be such that under centrifugal force all of it can find its way into the space 53, as illustrated in Fig. 2. The size of the space is designed to accomplish this.

Next, assume that the coil 21 is excited. This will produce a toroidal flux field circuit, as indicated by the dash lines F in Fig. 1. This surrounds the coil 21 and interlinks the magnetic parts 17, 25, 11, 47, 13, 29 and 9. At this point it will be seen that the purpose of the annular space 27 and the non-magnetic ring 15 is to prevent short-circuiting of this flux field before it reaches the ring 29. Between the rings 25 and 29 it traverses four air gaps. The right-hand gap is larger when the coil is deenergized. When the coil is excited it decreases. At the same time, the piston displacement effect between the rings 31 and 33 tends to squeeze lubricant out of the space radially inward into the gaps. This is augmented by an inward radial movement of the ring 59. Since there is a positive displacement action, a considerable variation in viscosities of the magnetic fluid mixture may be tolerated with assurance that the mixture will be positively squeezed inward a maximum distance into the magnetic gaps. As the mixture enters the gaps, it enters the toroidal magnetic field F and becomes inductively magnetized and stiffened so that its viscosity increases with a resulting increased resistance to shear. It should be noted in this connection that the rings 31 and 33 are nonmagnetic (aluminum) for the purpose of minimizing stray magnetic currents from entering the material when it is in position in the space 53. Such entry should be minimized because the magnetic field would tend to stiffen the materials in this region and inhibit its inward flow, which is undesirable. This is also the reason for making the studs 41 nonmagnetic.

The purpose of the barbs 18 (Fig. 5) is to act as small plows or grouters for aiding in directing the magnetic fluid inward. It will be understood in this connection that the rotation of the parts 17, 25 and 31, 33 and 29, relative to the plates 11 and 13, is as shown by the arrow on Fig. 5. The slots 16 act as lead-in passages for effecting a quick distribution of the magnetic mixture on both sides of both rings 11 and 13.

From the above it will be clear that the magnetic fluid mixture progresses from a more fluid (shearable) state to a more stiffened (less shearable) state as it progresses inward from the chamber 53 into position between the members 25, 11, 17, 13 and 29. Thus the transmitted torque is increased smoothly. By the time that all of the surfaces of these members are covered and before they come together, the magnetic fluid has stiffened to a point that, under the maximum torque to be transmitted it will no longer shear within its volume. Thus a 1:1 drive without slippage is achieved.

The stiffened material in position between the stated members also prevents the surfaces of 29 and 13 from coming into frictional contact. All friction occurs between the surfaces of 25, 11, 47, 13 and 29 and the magnetic fluid mixture next to them. At maximum excitation of the coil 21, the axial pressure is a maximum. This axial pressure maximizes the grouting-in action on the fluid and the friction between the interfaces between said members and the stiffened magnetic fluid mixture. Hence the torque transmitted is higher than it would be if the magnetic fluid mixture were simply interposed between faces and not placed under pressure. The fluid-filled gaps at this stage are of the order of .005 inch in thickness, which also measures the interposed film of stiffened and compressed magnetic fluid mixture.

To release the clutch, the coil 21 is deenergized, whereupon the viscosity of the magnetic fluid mixture decreases so that it again assumes a more liquid state to be flung clear by centrifugal force into the peripheral compartment 53, which at this time enlarges enough to receive all of it. The chamber enlarges due to the expanding action of the diaphragm 59. This action causes the member 29 to separate from the members 17, 25, so as to reintroduce free running clearance. While in the present embodiment expansive action alone of the diaphragm 59 is depended upon for the stated separation, it will be understood that additional springs may be used for the purpose, as in an ordinary friction clutch. The limit of separation is determined by the engagement between flange 39 of ring 37 with ring 31 (see Fig. 2).

It will be apparent that the stronger the magnetic field F is, the greater the capacity of the clutch will be. However, since the coil 21 is quite close to the chamber 53, the danger of stray flux affecting the magnetic fluid mixture when in this chamber is increased. This places a limitation upon the strength of this field F. Therefore, for clutches of extremely high capacity for their weight, the construction of Fig. 6 may be used, in which like numerals designate like parts, the primary difference being in a reshaping of the magnetic ring 17, which is designated 17' in Fig. 6. In this figure the additional flywheel element is designated 4. In this form of the invention, the ring 17' is formed with an additional groove 63 for accommodating an additional coil 65. This, when excited, produces an auxiliary toroidal flux FL, which interlinks only the ring 17', ring 29 and the inner flange 9 of the driven member 1. While this field FL does not inductively affect the films of magnetic fluid mixture between members 25, 11, 47, 13, 29, it does increase the compression on that fluid mixture by adding the tractive effect of coil 21 on ring 29. Thus the field from auxiliary coil 65 is in the nature of additional means for strongly increasing attraction and assisting coil 21 to increase the clutch plate pressure and hence to increase the frictional transmission of torque without further inductive effect on the magnetic fluid mixture. Such further inductive effect would not be of much help in increasing capacity and the field needed for the purpose would be so close to the chamber 53 as to invite stray currents into the magnetic fluid mixture therein, which as above pointed out is undesirable. Thus in this form of the invention the coil 21 may be designed to provide only enough flux F inductively to stiffen the magnetic fluid mixture, the auxiliary coil 65 being designed for the strong attractive function between rings 17, 25 and 29. This auxiliary coil 65, because of its inward position, may be designed for a large tractive force without danger of currents from its field FL straying into the chamber 53. The coil 21 is then designed only strong enough inductively to magnetize the magnetic fluid mixture to the extent desired without excessive flux leakage into said chamber 53.

As an example of the advantages of the invention, the actual diameter of a unit built according to the drawings herein is 11⅜ inches, wherein the outside diameters of the rings or plates 11, 13 are 9 inches. This clutch carries approximately 500 lb.-ft. of torque and by comparison with a friction clutch of equal capacity, is lighter in weight.

It will be understood that, as in ordinary friction clutches, the number of driving and driven plate surfaces may be increased or decreased.

The term magnetic flowable mixture as used herein is intended to comprehend any suitable flowable magnetic material whether of the liquid, semi-liquid (grease-like) or dry variety, wherein finely divided magnetizable particles are mixed with a wet or dry lubricant.

If necessary any leakage of the magnetic mixture that may, under certain circumstances, occur past a head 43 into space 45 may be released by a suitable bleeder port such as illustrated for example at 46a at the tops of Figs. 1 and 6. This is not necessary under all circumstances, as illustrated at the bottoms of Figs. 1 and 6.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. An electromagnetic clutch comprising relatively rotary magnetic surfaces which are movable apart to space them, means for inductively magnetizing said surfaces to attract them toward one another, elements forming a chamber which is contractible, said chamber communicating with the space between said surfaces, said means also contracting the chamber substantially simultaneously with attraction between the surfaces, the chamber being expansible in response to separation of the surfaces, and a magnetic flowable mixture carried in said chamber and movable from the chamber to the space, or from the space to the chamber in response to contraction and expansion respectively of the chamber.

2. An electromagnetic clutch comprising relatively rotary magnetic surfaces which are biased apart to space them, means for inductively magnetizing said surfaces to attract them axially toward one another, elements forming an annular rotary chamber which is contractible, said chamber communicating radially inward with the space between said surfaces, said means also contracting the chamber substantially simultaneously with attraction between the surfaces, the chamber being expansible in response to separation of the surfaces, and a magnetic flowable mixture carried normally only in said chamber when expanded and which by contraction of the chamber is forced therefrom to the space, or centrifugally flung from the space to the chamber upon separation of the surfaces.

3. An electromagnetic clutch comprising relatively rotary magnetic surfaces which are biased apart to space them, means for inductively magnetizing said surfaces to attract them axially toward one another, elements forming an annular rotary chamber which is contractible, said chamber communicating radially inward with the space between said surfaces, said means also contracting the chamber substantially simultaneously with attraction between the surfaces, the chamber being expansible in response to separation of the surfaces and a magnetic fluid mixture carried in said chamber and which by contraction of the chamber is forced therefrom to the space, or centrifugally flung from the space to the chamber upon separation of the surfaces, the inductive magnetization of the surfaces when attracted being located in a region of the surfaces contacted by the magnetic fluid mixture, whereby the latter is inductively magnetized when located in said space.

4. An electromagnetic clutch comprising relatively rotary radial magnetic surfaces which are axially movable apart to space them, elements forming a peripheral rotary chamber which is contractible, peripheral means near the chamber for inductively magnetizing said surfaces to attract them axially toward one another, said chamber communicating radially inward with the space between said surfaces, said means also contracting the chamber substantially simultaneously with magnetic attraction between the surfaces, the chamber being expansible in response to separation of the surfaces, a magnetic fluid mixture carried in said chamber which is forced into the space radially inward from the chamber by its contraction, or centrifugally flung from the space to the chamber upon separation of the surfaces, the means near the chamber for inductively magnetizing the surfaces being in a region of the surfaces contacted by the magnetic fluid mixture whereby the fluid mixture is also inductively magnetized, and a second means for inductively magnetizing said surfaces in a region distant from the chamber.

5. An electromagnetic clutch comprising relatively rotary radial magnetic surfaces which are axially movable apart to space them, elements forming a nonmagnetic peripheral rotary chamber which is contractible, an annular coil near the chamber for inductively magnetizing said surfaces to attract them axially toward one another, said chamber communicating radially inward with the space between said surfaces, said elements also contracting the chamber substantially simultaneously with magnetic attraction between the surfaces, the chamber being expansible in response to separation of the surfaces, a magnetic fluid mixture carried in said chamber which is forced into the space radially inward from the chamber by its contraction, or centrifugally flung from the space to the chamber upon separation of the surfaces, the coil near the chamber for inductively magnetizing the surfaces being in a region of the surfaces contacted by the magnetic fluid mixture, and a second annular coil for inductively magnetizing said surfaces in a region distant from the chamber in a radially inward direction.

6. An electromagnetic clutch comprising driving and driven magnetic clutch members carrying surfaces which have space therebetween, said members being relatively movable in a direction to reduce said space, means for producing a magnetic field interlinking said members to attract them toward one another, a compartment for containing a magnetic fluid mixture, said compartment being in communication with said space, a quantity of magnetic fluid mixture substantially all of which is adapted to be contained in said compartment, a member which is movable to decrease the size of said compartment, and a magnetic member responsive to increase in the magnetic field and connected with said last-named movable member to move it in the direction of said decrease in compartment size substantially simultaneously with relative movement between said clutch members toward one another, whereby the fluid mixture is transferred from the compartment into said space as the latter decreases in response to attractive movement between said clutch members as caused by the magnetic field.

7. An electromagnetic clutch comprising driving and driven magnetic clutch members carrying surfaces which have space therebetween, said members being relatively movable in a direction to reduce said space, means for producing a magnetic field interlinking said members to attract them toward one another and crossing their surfaces and said space, a compartment for containing a magnetic fluid mixture, said compartment being in communication with said space, a quantity of magnetic fluid mixture substantially all of which is adapted to be contained in said compartment, a member which is movable to decrease the size of said compartment, and a magnetic member responsive to increase in the magnetic field and connected with the last-named movable member to move it in the direction of said decrease in compartment size substantially simultaneously with relative movement between said clutch members toward one another, whereby the fluid mixture is transferred from the compartment into said space as the latter decreases in response to attractive movement between said clutch members caused by the magnetic field, said field inductively magnetizing said fluid mixture to increase its viscosity as it enters the space.

8. An electromagnetic clutch comprising coaxial relatively rotary driving and driven magnetic clutch members carrying surfaces which have space therebetween, said members being axially relatively movable in a direction to reduce said space, means for producing a magnetic field interlinking said members to attract them toward one another and crossing their surfaces and said space, a compartment for containing a magnetic fluid mixture, said compartment being in communication with said space, a quantity of magnetic fluid mixture substantially all of which is adapted to be contained in said compartment, a member which is movable to decrease the size of said compartment, and a magnetic member responsive to increase in the magnetic field and connected with the last-named movable member to move it in the direction of said decrease in compartment size substantially simultaneously with relative movement between said clutch members toward one another, whereby the fluid mixture is transferred from the compartment into said space as the latter decreases in response to the attractive movement between said clutch members caused by the magnetic field, said field inductively magnetizing said fluid mixture to increase its viscosity as it enters the space, and said space being radially so disposed relative to the axis of rotation that upon deenergization of said field the fluid mixture will be centrifugally forced therefrom.

9. An electromagnetic clutch comprising coaxial driving and driven magnetic members carrying radially flat surfaces which have space therebetween, said members being axially relatively movable in a direction to reduce said space, an annular field coil for producing a torodial magnetic field interlinking said members to draw them toward one another, an expansible and contractible compartment surrounding said surfaces for containing a magnetic fluid mixture, said compartment being in communication with said space, a quantity of magnetic fluid mixture substantially all of which is adapted to be contained in said compartment when expanded, said field being adapted to reduce the sizes of the compartment and said space in response to excitation of said coil, whereby the fluid mixture is transferred from the compartment to said space as the latter decreases in response to the attractive movement between said members caused by the field.

10. An electromagnetic clutch comprising relatively rotary radial magnetic surfaces which are axially movable apart to space them, elements forming a peripheral rotary chamber which is contractible, peripheral means near the chamber for inductively magnetizing said surfaces to attract them axially toward one another, said chamber communicating radially inward with the space between said surfaces, said means being adapted to contract the chamber substantially simultaneously with magnetic attraction between the surfaces, the chamber being expansible in response to separation of the surfaces, a magnetic fluid carried in said chamber which is forced into the space radially inward from the chamber by its contraction, or centrifugally flung from the space to the chamber upon separation of the surfaces, the means near the chamber for inductively magnetizing the surfaces being in a region of the surfaces contacted by the magnetic fluid whereby the fluid is also inductively magnetized, and a second means for inductively magnetizing said surfaces in a region distant from the chamber.

11. An electromagnetic clutch comprising coaxial driving and driven magnetic members carrying radially flat surfaces which have space therebetween, said members being axially relatively movable in a direction to reduce said space, an annular field coil for producing a toroidal magnetic field interlinking said members to draw them toward one another, a nonmagnetic expansible and contractible compartment surrounding said surfaces for containing a magnetic fluid mixture, said compartment being in communication with said space, a quantity of magnetic fluid mixture substantially all of which is adapted to be contained in said compartment when expanded, said field being adapted to reduce the size of the compartment and said space in response to excitation of said coil, whereby the fluid mixture is transferred from the compartment to said space as the latter decreases in response to the attractive movement between said members caused by the magnetic field, and means for biasing apart said magnetic members and expanding the compartment when the coil is deenergized.

12. An electromagnetic clutch comprising coaxial driving and driven magnetic members carrying radially flat surfaces which have space therebetween, said members being axially relatively movable in a direction to reduce said space, a nonmagnetic expansible and contractible compartment closely surrounding said surfaces for containing a magnetic fluid mixture, a first annular field coil carried in one of the members closely adjacent to and within said compartment for producing a toroidal magnetic field interlinking said members to draw them toward one another, said compartment being in direct communication with the closely adjacent space, a quantity of magnetic fluid mixture substantially all of which is adapted to be contained in said compartment when expanded, said field being adapted to reduce the size of the compartment and said space in response to excitation of said first coil, whereby the fluid mixture is transferred from the compartment to said space as the latter decreases in response to the attractive movement between said members caused by the magnetic field of said first coil, and a second annular field coil carried in said one member and of smaller diameter than the first coil and producing a toroidal magnetic field interlinking said members at a region spaced further from said compartment than the toroidal field of the first coil.

13. An electromagnetic clutch comprising coaxial driving and driven magnetic members carrying radially flat surfaces which have space therebetween, said members being axially relatively movable in a direction to reduce said space, a nonmagnetic expansible and contractible compartment closely surrounding said surfaces for containing a magnetic fluid mixture, a first annular field coil carried in one of the members closely adjacent to and within said compartment for producing a toroidal magnetic field interlinking said members at a first magnetic region to draw them toward one another, said compartment being in direct communication with the closely adjacent space, a quantity of magnetic fluid mixture substantially all of which is adapted to be contained in said compartment when expanded, said field being adapted to reduce the size of the compartment and said space in response to excitation of said first coil, whereby the fluid mixture is transferred from the compartment to said space near said first magnetic region as the space decreases in response to the attractive movement between said members caused by the magnetic field of said first coil, and a second annular field coil carried in said one member and of smaller diameter than the first coil and producing a toroidal magnetic field interlinking said members at a second magnetic region spaced further from said compartment than the first magnetic region, the arrangement being such that substantially no magnetic fluid mixture reaches the space between the magnetic members within said second magnetic region.

14. An electromagnetic clutch comprising driving and driven magnetic members, one of said members consisting of at least one magnetic flange surrounded by a nonmagnetic band to which are attached spaced outer magnetic rings, the other member comprising at least two relatively movable magnetic plates axially enclosing the other member and spaced therefrom, said plates being axially movable and each including a surrounding nonmagnetic ring, the rings being joined by flexible material to form an expansible chamber, axially slidable connections between the plates which prevent relative rotary movement therebetween, at least one other magnetic ring driven by said axially slidable members and having axial movement thereon and reaching inward between said magnetic rings, a magnetic fluid mixture which is transferable upon relative axial movement of the plates to and from the chamber and the group of spaces between the plates and rings, and an annular field coil carried by one plate providing a toroidal flux field interlinking the plates in the regions of the rings.

15. An electromagnetic clutch comprising driving and driven magnetic members, one of said members consisting of at least one magnetic flange surrounded by a nonmagnetic band to which are attached spaced outer magnetic rings, the other member comprising at least two relatively movable magnetic plates axially enclosing the other member and spaced therefrom, said plates being axially movable and each including a surrounding nonmagnetic ring, the rings being joined by flexible material to form an expansible chamber, axially slidable connections between the plates which prevent relative rotary movement therebetween, at least one other magnetic ring driven by said axially slidable members and having axial movement thereon and reaching inward between said magnetic rings, a magnetic fluid mixture which is transferable upon relative axial movement of the plates to and from the chamber and spaces between the plates and rings, an annular field coil carried by one plate providing a toroidal flux field interlinking the plates in the regions of the rings, and a second annular field coil carried by one of the plates and substantially only interlinking said flange.

16. An electromagnetic clutch comprising driving and driven magnetic members, one of said members consisting of at least one magnetic flange surrounded by a nonmagnetic band to which are attached spaced outer magnetic rings, the other member comprising at least two relatively movable magnetic plates axially enclosing the other member and spaced therefrom, said plates being axially movable and each including a surrounding nonmagnetic ring, the rings being joined by flexible material to form an expansible chamber, axially slidable connections between the plates which prevent relative rotary movement therebetween, at least one other magnetic ring driven by said axially slidable members and having axial movement thereon and reaching inward between two of said magnetic rings, a magnetic fluid mixture which is transferable upon relative axial movement of the plates to and from the chamber and the group of spaces between the plates and rings, means for establishing a toroidal flux field interlinking the plates in the regions of the rings, said spaced outer magnetic rings having inwardly directed slots for distribution of entering magnetic fluid mixture, and grouting members associated with the ends of said slots.

17. An electromagnetic clutch comprising driving and driven members having spaced magnetic surfaces, means for producing a magnetic field interlinking said magnetic surfaces, a compartment for containing flowable magnetic material, said compartment being in communication with the space between said surfaces, a quantity of magnetic fluid mixture in said compartment, a member which is movable to decrease the size of said compartment, and a magnetic member responsive to increase in said magnetic field and connected to said movable member to move it in the direction of said decrease, whereby the mixture is transferred from the compartment to the space and inductively magnetized to stiffen therein.

18. An electromagnetic clutch comprising driving and driven members having radial flat spaced magnetic surfaces, means for producing a magnetic field perpendicularly intersecting said magnetic surfaces, a compartment for containing a magnetic fluid mixture, said compartment being in radial communication with the space between said surfaces, a quantity of a magnetic fluid mixture in said compartment, a member which is movable to decrease the size of said compartment, and a magnetic member responsive to increase in said magnetic field and connected to said movable member to move it in the direction of said decrease, whereby the fluid mixture is transferred from the compartment to the space and inductively magnetized to stiffen therein.

19. An electromagnetic clutch comprising driving and driven members having spaced magnetic surfaces, means for producing a magnetic field interlinking said magnetic surfaces, a compartment for containing a magnetic fluid mixture, said compartment being in communication with the spaces between said surfaces, a quantity of magnetic fluid mixture in said compartment, a member which is movable to decrease the size of said compartment, a magnetic member responsive to increase in said magnetic field and connected to said movable member to move it in the direction of said decrease, whereby the fluid mixture is transferred from the compartment to the spaces and inductively magnetized to stiffen therein, and means whereby at least one of said spaces in response to increase in said field also decreases in size to compress the fluid mixture entering the spaces.

MARTIN P. WINTHER.
ANTHONY WINTHER.

REFERENCES CITED

The following references are of record in the file of this patent:

UNITED STATES PATENTS

| Number | Name | Date |
|---|---|---|
| 727,689 | Reist | May 12, 1903 |
| 754,291 | Eastwood | Mar. 8, 1904 |
| 882,607 | Anderson | Mar. 24, 1908 |
| 1,823,334 | Payne | Sept. 15, 1931 |
| 2,267,650 | Hale | Dec. 23, 1941 |
| 2,525,571 | Winther | Oct. 10, 1950 |

OTHER REFERENCES

Bureau of Standards Technical Report 1213, Mar. 30, 1948.